(12) United States Patent
Becker et al.

(10) Patent No.: US 7,640,594 B2
(45) Date of Patent: Dec. 29, 2009

(54) SECURE STORAGE IN A FILE SYSTEM (75) Inventors: Georg C. Becker, Walldorf (DE); Ralf Kuersch, Sandhausen (DE); Dietmar Theobald, Karlsruhe (DE); Juergen Schneider, Ludwigshafen (DE)

(73) Assignee: SAP AG, Walldorf (DE)

( * ) Notice: Subject to any disclaimer, the term of this patent is extended or adjusted under 35 U.S.C. 154(b) by 840 days.

(21) Appl. No.: 10/762,834

(22) Filed: Jan. 21, 2004

(65) Prior Publication Data

US 2005/0201562 A1 Sep. 15, 2005

(51) Int. Cl.
*H04L 9/06* (2006.01)
*H04L 9/32* (2006.01)

(52) U.S. Cl. .............................. 726/30; 707/9; 713/151; 713/152

(58) Field of Classification Search ..................... 726/2, 726/30; 707/2–5, 9–10
See application file for complete search history.

(56) References Cited

U.S. PATENT DOCUMENTS

2003/0105977 A1* 6/2003 Brabson et al. ............. 713/201

OTHER PUBLICATIONS

Dessiatnikov, Dmitry. "Securing SQL Connection String" SANS Institute Jan. 8, 2004.*

* cited by examiner

*Primary Examiner*—Jung Kim
*Assistant Examiner*—Venkat Perungavoor
(74) *Attorney, Agent, or Firm*—Schwegman, Lundberg & Woessner, P.A.

(57) ABSTRACT

A node may contain a secure store agent. A process executing on the node may request connection information from the secure store agent. An encryption key phrase may be accessed, responsive to the request for connection information, to decrypt the requested connection information. The requested connection information may be obtained from a secure storage file in a file system.

15 Claims, 8 Drawing Sheets

SECURE STORAGE IN A FILE SYSTEM

TECHNICAL FIELD

Embodiments of the invention generally relate to the field of client/server systems and, more particularly, to a system and method for secure storage in a file system.

BACKGROUND

Conventional client/server systems may include a client, an application server, and a database system. The client may submit a database access statement to the application server. The application server may receive the database access statement and establish a connection to the database system to retrieve the requested data. Typically, the application server is connected to the database system over a network (e.g., a Local Area Network (LAN)).

Establishing a connection to the database system is typically a two-part process: loading an appropriate driver and connecting to the database system using the appropriate driver. Loading an appropriate driver is typically accomplished with a method call. For example, the client/server system may employ a Java Database Connectivity (JDBC) Application Program Interface (API) that complies with the Java 2 Platform, Standard Edition (J2SE), version 1.4.2, published June 2003 (the J2SE Standard). Loading an appropriate driver from the JDBC API may be done, for example, with the following line of code: Class.forName("jdbc.DriverXYZ").

The second part of the process is to connect to the database system using the loaded driver. The following line of code illustrates connecting to the database system using the loaded driver: connection con=DriverManager.getConnection ("address," "login," "password"). The terms "address," "login," and "password" illustrate connection information that is accessed by an application server to establish a connection to a database.

In conventional client/server systems, the connection information is stored as plain text in a file system and accessed, as needed, by an application server. Storing connection information as plain text in a file system leads to potential security problems. For example, file systems are vulnerable to access by unauthorized users. Further, unauthorized users may readily comprehend the value of plain text connection information (e.g., plain text passwords, addresses, etc.) that is stored in a file system. Also, if the file system is connected to the application server by a network, then connection information may be vulnerable as it is communicated over the network.

SUMMARY OF THE INVENTION

A system and method for secure storage in a file system is described. An application executing on an application server may request connection information so that it can connect to another node. An encryption key phrase may be accessed, responsive to the request for the connection information. The requested connection information may be obtained from a secure storage file in a file system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for secure storage in a file system. In an embodiment, the secure storage is in a file system that is accessible by one or more application servers in the application layer of a distributed system. As is further explained below, the system and method for secure storage in a file system may be used to store database connection information.

Figure 1:
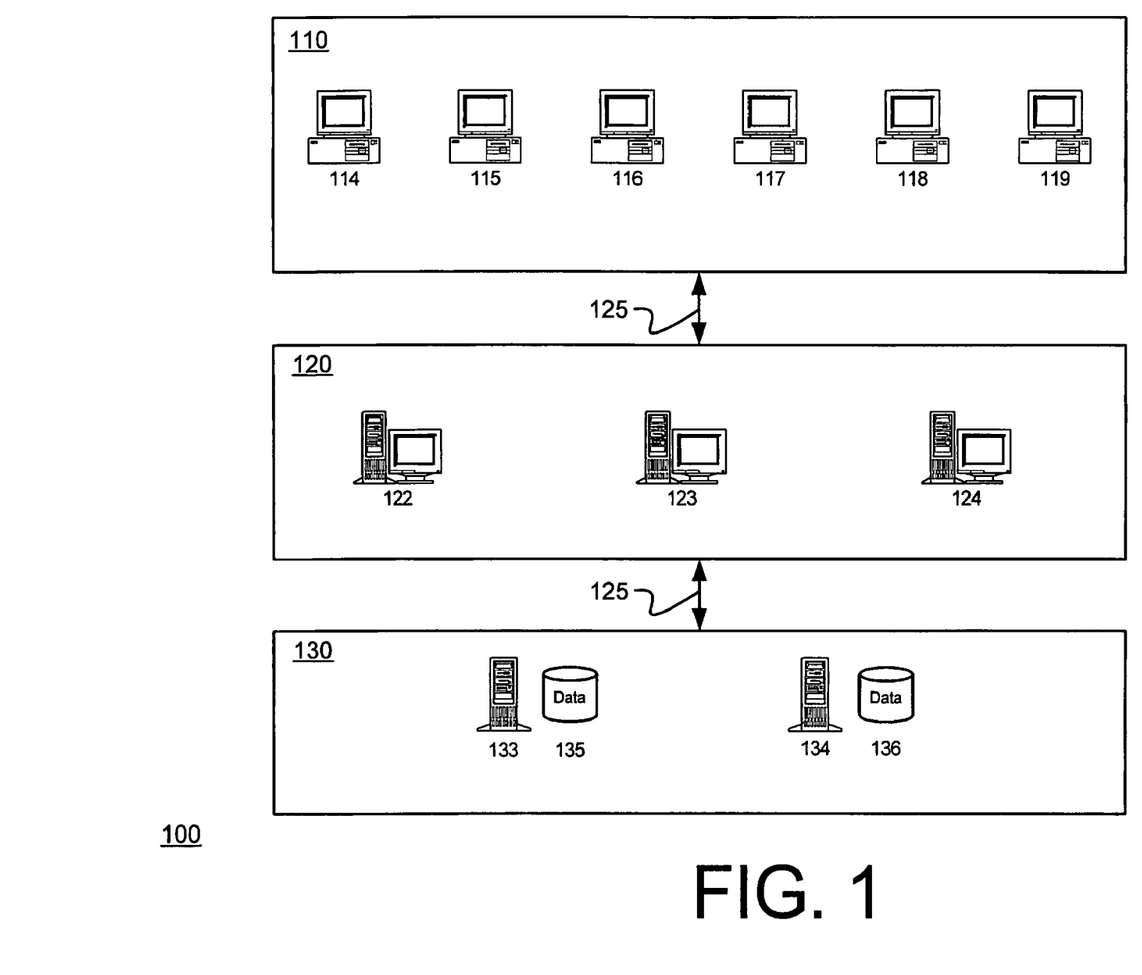
FIG. 1 is a block diagram of distributed system 100.

FIG. 1 is a block diagram of distributed system 100. The illustrated embodiment of distributed system 100 includes: user layer 110, application layer 120, and database layer 130. Some or all of the elements within each layer of distributed system 100 may be interconnected via a network (e.g., a Local Area Network (LAN)). Alternative embodiments of distributed system 100 may include more or fewer layers.

User layer 110 is the interface between distributed system 100 and one or more users. The illustrated embodiment of user layer 110 includes user terminals 114-119. One or more of user terminals 114-119 may collect user input and send it to application layer 120 over network connection 125. Network connection 125 may be any kind of network connection including, for example, a wired or wireless connection to a Local Area Network (LAN), a Wide Area Network (WAN), a Metropolitan Area Network (MAN), and/or the Internet. User terminals 114-119 may be personal computers, notebook computers, personal digital assistants, telephones, and the like. In an embodiment in which network connection 125 connects to the Internet, one or more of user terminals 114-119 may have a Web browser to interface with the Internet.

Application layer 120 includes application servers 122-124. An application server broadly refers to a computing device that performs data processing. In an embodiment, application layer 120 includes a computing device (e.g., called a dispatcher) to perform load balancing among application servers 122-124. In an embodiment in which application layer 120 exchanges information with user layer 110 via the Internet, one or more of application servers 122-124 may be described as a Web application server. Application servers 122-124 may be implemented according to the Java 2 Enterprise Edition Specification v1.4, published on Jul. 12, 2002 (the J2EE Standard), in an embodiment of the invention.

Database layer 130 provides a persistent data store for distributed system 100. The illustrated embodiment of database layer 130 includes database management systems (DBMSs) 133 and 134 as well as data sources 135 and 136. A DBMS refers to application software that controls the data in data sources 135 and 136 including the overall organization of the data, retrieval of the data, and integrity of the data. Data sources 135 and 136 may be databases or other systems capable of providing a persistent data store.

Figure 2:
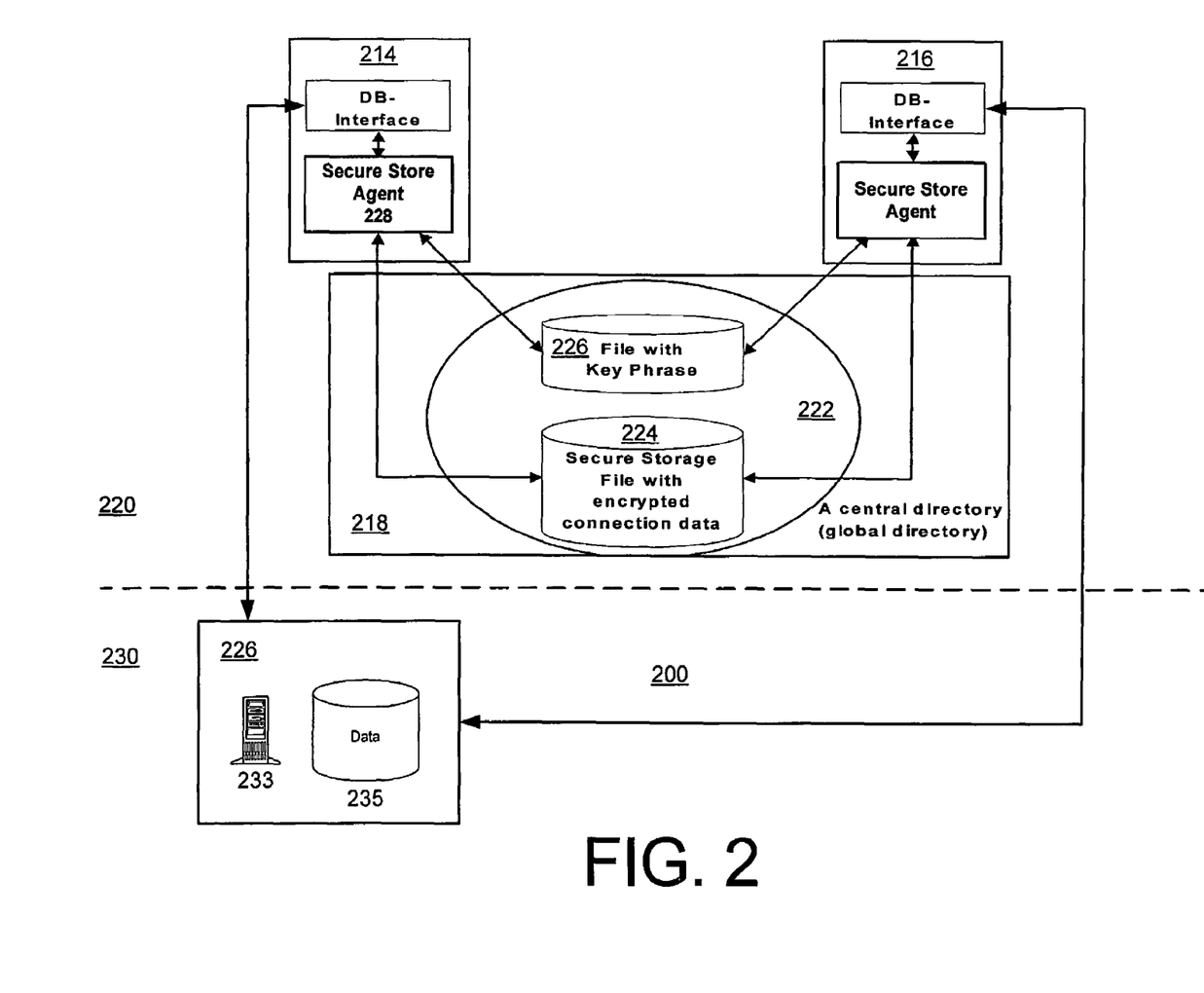
FIG. 2 is a block diagram of selected elements of distributed system 200 providing secure storage in the file system according to an embodiment of the invention.

FIG. 2 is a block diagram of selected elements of distributed system 200 providing secure storage in the file system according to an embodiment of the invention. Distributed system 200 includes application layer 220 and database layer 230. Application layer 220 includes application servers 214 and 216. Application servers 214 and 216 each have access to a file system 218. A "file system" is a system that an operating system or a program uses to organize and keep track of files. In an embodiment, files system 218 includes global directory 222. A directory refers to an organizational unit used to organize files into a structure, for example, a hierarchical structure. A global directory is a directory that may be accessed by more than one application server. In an embodiment, global directory 222 is the profile directory for application layer 220. A profile directory is a directory that contains, among other things, the technical system configuration data.

In an embodiment, global directory 222 includes secure storage file 224. Secure storage file 224 stores, for example, name/value pairs of strings. As is further described below, the stored name/value pairs of strings may be encrypted. In an embodiment, application servers 214 and 216 do not store plain text passwords and other database connection information. Instead, application servers 214 and 216 are assigned encryption key phrases (or simply, key phrases) which, in the illustrated example, are stored in key phrase file 226.

Application servers 214 and 216 store, manipulate, and/or access persistent data from database system 226. The illustrated embodiment of database system 226 includes DBMS 233 and data source 235. Data source 235 may be any persistent data store (e.g., a database).

Using application server 214 as an example, a database connection may be formed in the following manner. On startup (or other events), a process executing on application server 214 may request a database connection. In response, secure store agent 228 accesses a key phrase from key phrase file 226. Secure store agent 228 also finds a name/value pair stored in secure storage 224 that corresponds to the requested connection. In an embodiment, the stored name/value pair includes database connection information (e.g., password, database address, etc.). Secure store agent 228 passes the database connection information to the requesting application. In an embodiment, obtaining database connection information from the secure store is transparent to the requesting process and/or a user (not shown). In alternative embodiments, application servers 214 and 216 store and retrieve other information in secure storage file 224. The functions of secure store agent 228 are further described below.

Figure 3:
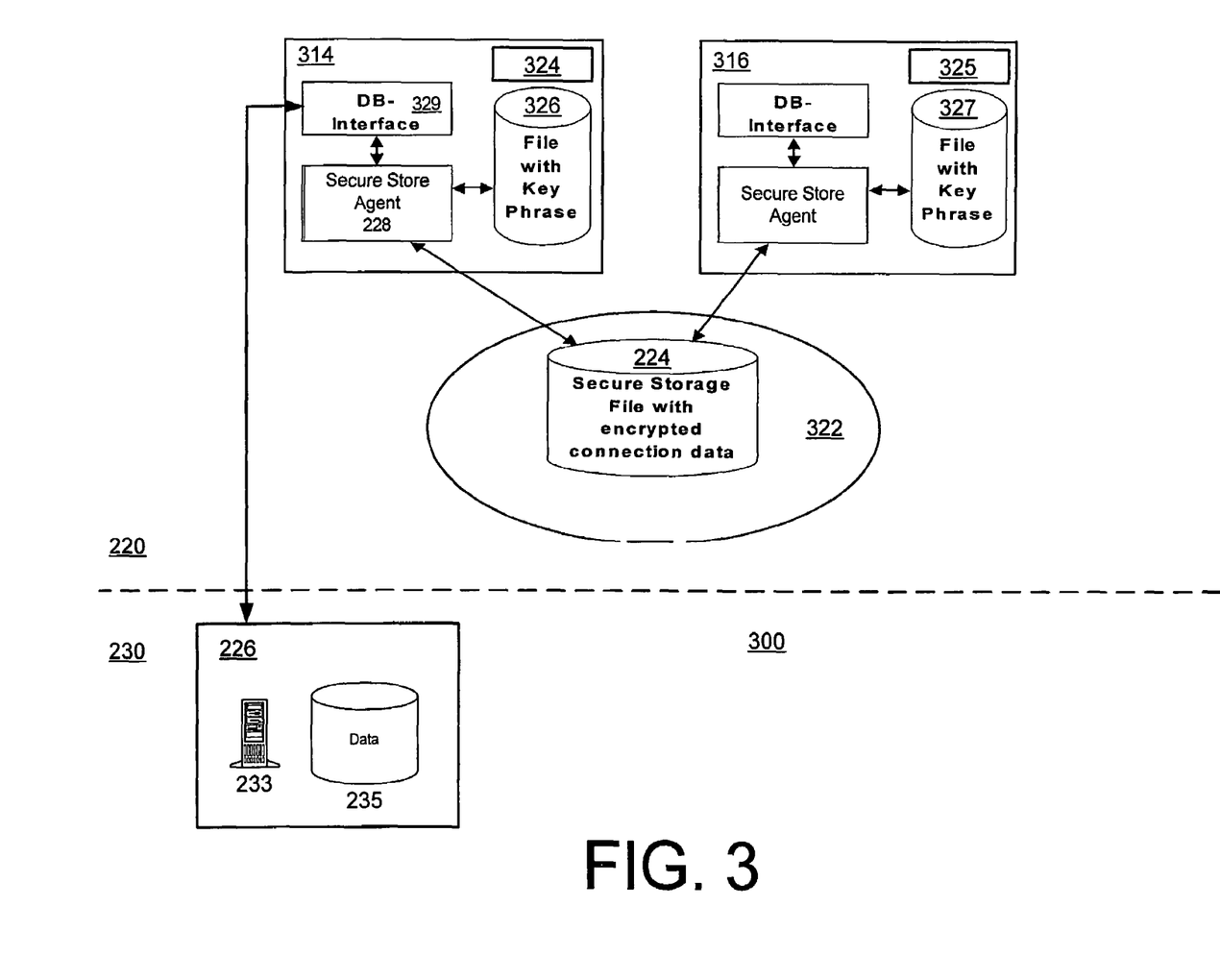
FIG. 3 is a block diagram of selected elements of distributed system 300 providing secure storage in the file system according to an alternative embodiment of the invention.

FIG. 3 is a block diagram of selected elements of distributed system 300 providing secure storage in the file system according to an alternative embodiment of the invention. Many of the elements shown in FIG. 3 are similar to elements shown in FIG. 2 and those elements have similar (or the same) reference numbers. Distributed system 300 includes Web application servers 314 and 316 implemented according to the J2EE Standard.

Web application servers 314 and 316 include key phrase files 326 and 327 respectively to store encryption key phrases. A process executing on Web application server 314 (not shown) may request a connection to database system 226 (e.g., during start-up of Web application server 314). In response to the request, secure store agent 228 may access a key phrase stored in key phrase file 326. In the illustrated embodiment, key phrase file 326 is part of Web application server 314's file system. In yet another alternative embodiment, there is no key phrase file 326 and instead Web application server 314 prompts a user (e.g., an administrator) to provide the key phrase as needed. In an embodiment, key phrase file 327 in Web application server 316 is a copy of key phrase file 326.

In an embodiment, database interface 329 passes a name that corresponds to the connection request to secure store agent 228. Secure storage agent 228 matches the name to a name/value pair stored in secure storage file 224 (e.g., via a find operation). In the illustrated embodiment, secure storage file 224 is located within profile directory 322 of application layer 220. As will be further explained below, stored name/value pairs may or may not be encrypted. Secure store agent 228 receives the matching name/value pair and passes it to database interface 329 which parses it to obtain database connection information (or other information). The database connection information is then passed to the requesting process.

In yet another alternative embodiment, secure storage file 224 is replicated to the local file systems of Web application servers 314 and 316. For example, in an embodiment, Web application sever 314 includes secure storage file 324 and Web application server 316 includes secure storage file 325. In such an embodiment, it is not necessary to have a globally accessible secure storage file 224 because each application server may access a local copy of the secure storage file (e.g., secure storage files 324 and 325).

In an embodiment, secure storage file 224 is not encrypted. In such an embodiment, it is not necessary to have key phrase files 326 and 327. Key phrase files 326 and 327 may be created, for example, when an unencrypted file is migrated to an encrypted file. Similarly, in an embodiment in which users provide key phrases through, for example, a dialogue box, it is not necessary to have key phrase files 326 and 327.

Figure 4:
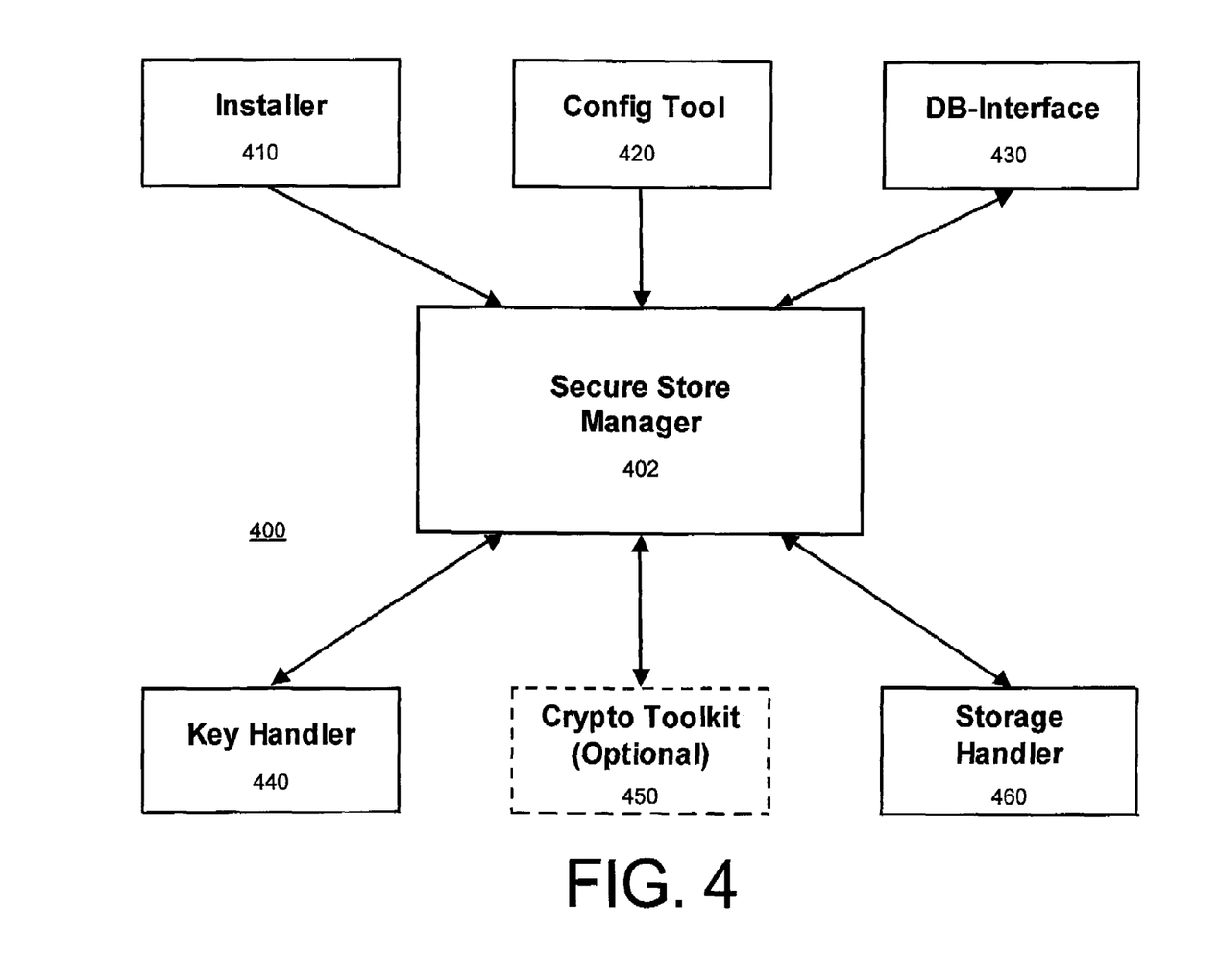
FIG. 4 is a functional block diagram of selected elements of secure store agent 400.

FIG. 4 is a functional block diagram of selected elements of secure store agent 400. The illustrated embodiment of secure store agent 400 includes the following interfaces: Installer 410, configuration tool 420, database interface 430, key handler 440, cryptographic toolkit 450, and storage handler 460. The term interface refers to an element of secure store agent 400 that provides an access to hardware and/or software.

In an embodiment, installer 410 creates a secure storage file (e.g., secure storage file 224, shown in FIG. 2). In an embodiment, three types of secure storage files may be created: secure storage file without encryption, secure storage file with encryption using a key phrase, and secure storage file with encryption not using a key phrase. Installer 410 creates a secure storage file without encryption if, for example, optional cryptographic toolkit 450 is not included in secure store agent 400. If installer 410 creates a secure storage with encryption using a key phrase, an administrator may decide what the key phrase is. The administrator may also decide whether the key phrase is stored in a key phrase file or requested as needed. Installer 410 may create a secure store with encryption not using a key phrase if, for example, the secure storage file is associated with a hardware device that has a built-in encryption key.

In an embodiment, configuration tool 420 provides a user interface and passes a number of tasks to secure store manager 402. Configuration tool 420 may be used to pass name/value pairs to secure store manager 402 so that they can be placed in a secure storage file. This function is particularly important when the name/value pairs include database connection information because configuration tool 420 is an "offline tool," that is, configuration tool 420 can pass name/value pairs when an application server does not yet have a database connection. Configuration tool 420 may also pass the task of changing or deleting a name/value pair to secure store manager 402. In an embodiment, a user may request a list of stored name/value pairs through configuration tool 420.

A user may also use configuration tool 420 to migrate a secure storage file from unencrypted mode to encrypted mode. Instances of secure store agent 400 may be acquired without cryptographic toolkit 450 due to legal restrictions on transferring encryption tools. In an embodiment, optional cryptographic toolkit 450 may be added to secure store agent 400 after a secure storage file has been created. In such cases, configuration tool 420 provides the interface for a user to migrate a secure storage file from unencrypted mode to encrypted mode. In an embodiment, configuration tool 420 also allows a user to change the value of a key phrase that is associated with a stored name/value pair.

Database interface 430 provides an interface between secure store agent 400 and an executing process that requests a connection to a database. In an embodiment, database interface 430 automatically passes a request for connection information to secure store manager 402. Secure store manager 402 obtains the requested connection information and passes it back to database interface 430. The process of obtaining connection information responsive to a request is more fully described below with reference to FIG. 5 and key handler 440.

In an embodiment, optional cryptographic toolkit 450 provides the encryption (and decryption) algorithms to encrypt information stored in a secure storage file. In an embodiment, cryptographic toolkit 450 is the Institute for Applied Information Processing and Communications, Graz University of Technology (IAIK) Java Cryptography Extension (JCE) cryptographic toolkit. In alternative embodiments, other cryptographic toolkits may be used.

In an embodiment, storage handler 460 stores and retrieves name/value pairs from a secure storage file. In an embodiment, the key phrase, names, and values are character strings. The key phrase may comply with a coded character set, for example, the coded character set described in International Organization for Standards/International Electrotechnical Commission (ISO/IEC) 10646 entitled, "Universal Multiple-Octet Coded Character Set," published in 1993. Storage handler 460 provides a number of methods for use by secure store agent 400 including: inserting a name/value pair into a secure storage file, changing and/or deleting a name/value pair from a secure storage file, and obtaining a value matching a particular key phrase from a secure storage file. Storage handler 460 may also provide a method to copy and/or delete a secure storage file.

Figure 5:
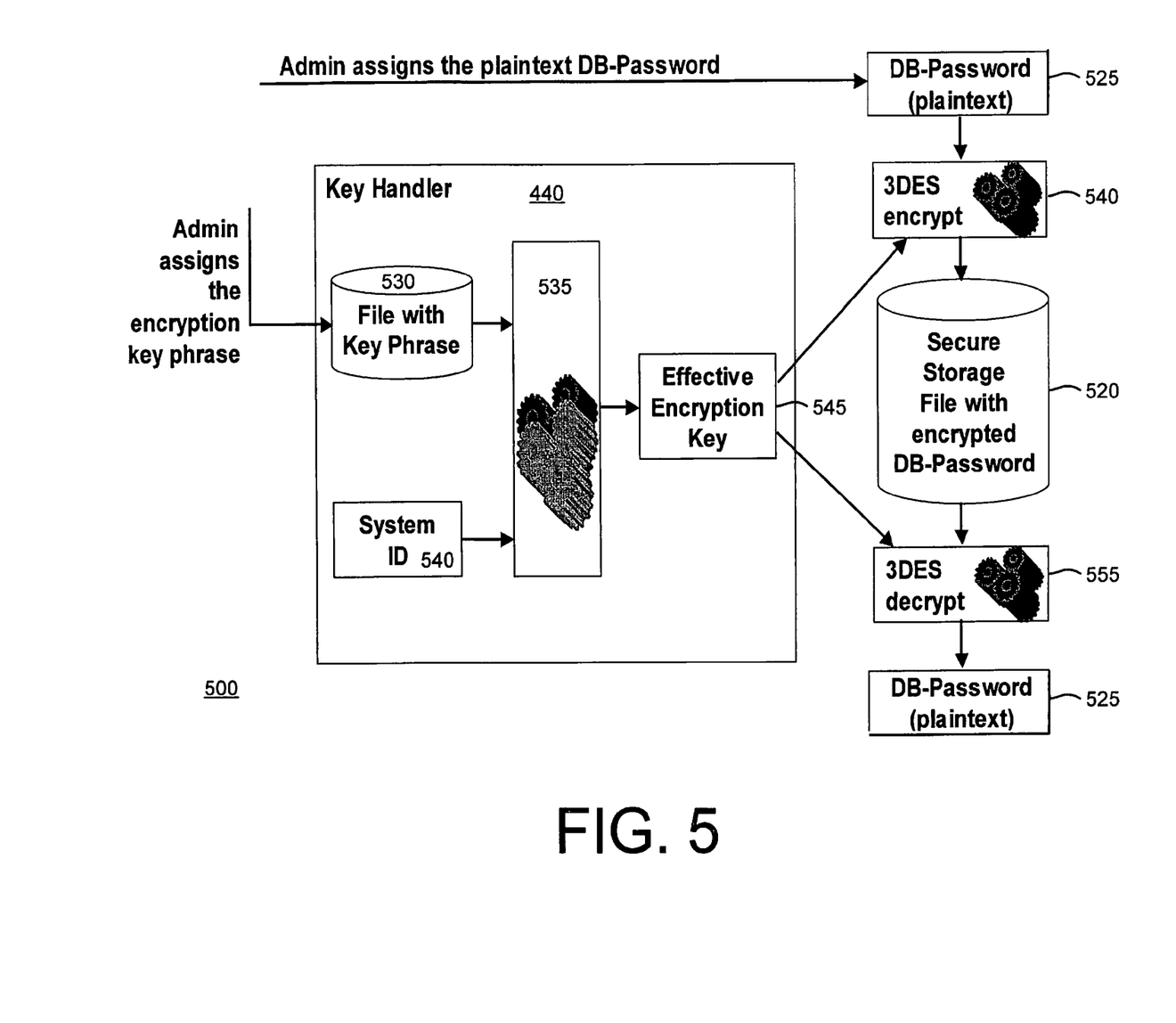
FIG. 5 is a conceptual block diagram of selected elements of application layer 500 implemented according to an embodiment of the invention.

FIG. 5 is a conceptual block diagram of selected elements of application layer 500 implemented according to an embodiment of the invention. Application layer 500 includes key handler 440 and secure storage file 520. In an embodiment, key handler 440 is part of a secure store agent (e.g., secure store agent 400 shown in FIG. 4) executing within an application server (e.g., web application server 314 shown in FIG. 3).

In an embodiment, an administrator assigns database password 525 and a corresponding key phrase. The key phrase may be stored in key phrase file 530. Key phrase file 530 may be stored in the file system of the application server in which key handler 440 is executing. Access to key phrase file 530 may be protected, in part, by operating system access rights.

Effective encryption key generator 535 generates effective encryption key 545 based, at least in part, on a key phrase from key phrase file 530. In the illustrated embodiment, the effective encryption key is a combination of the key phrase and system identifier 540. System identifier 540 identifies the application server in which key handler 440 is executing. In an embodiment, a password-based encryption (PBE) mechanism of a cryptographic toolkit (e.g., cryptographic toolkit 450, shown in FIG. 4) is used to create the effective encryption key based on the key phrase and, for example, a system identifier. In alternative embodiments, other PBE mechanisms may be used.

Effective encryption key 545 may be used to encrypt and decrypt database password 525. As illustrated at reference numeral 540, database password 525 may be encrypted according to the American National Standards Institute (ANSI) X9.52-1998 standard, entitled, Triple Data Encryption Algorithm Modes of Operation (hereinafter, the Triple DES Standard). In alternative embodiments of the invention other encryption mechanisms may be used. Encrypted database password 525 may be stored in secure storage file 520. As illustrated at reference numeral 555, effective encryption key 545 may also be used to decrypt database password 525 according to, for example, the Triple DES Standard. Decrypted database password 525 may then be passed to an application (not shown) to complete the database connection process.

Figure 6:
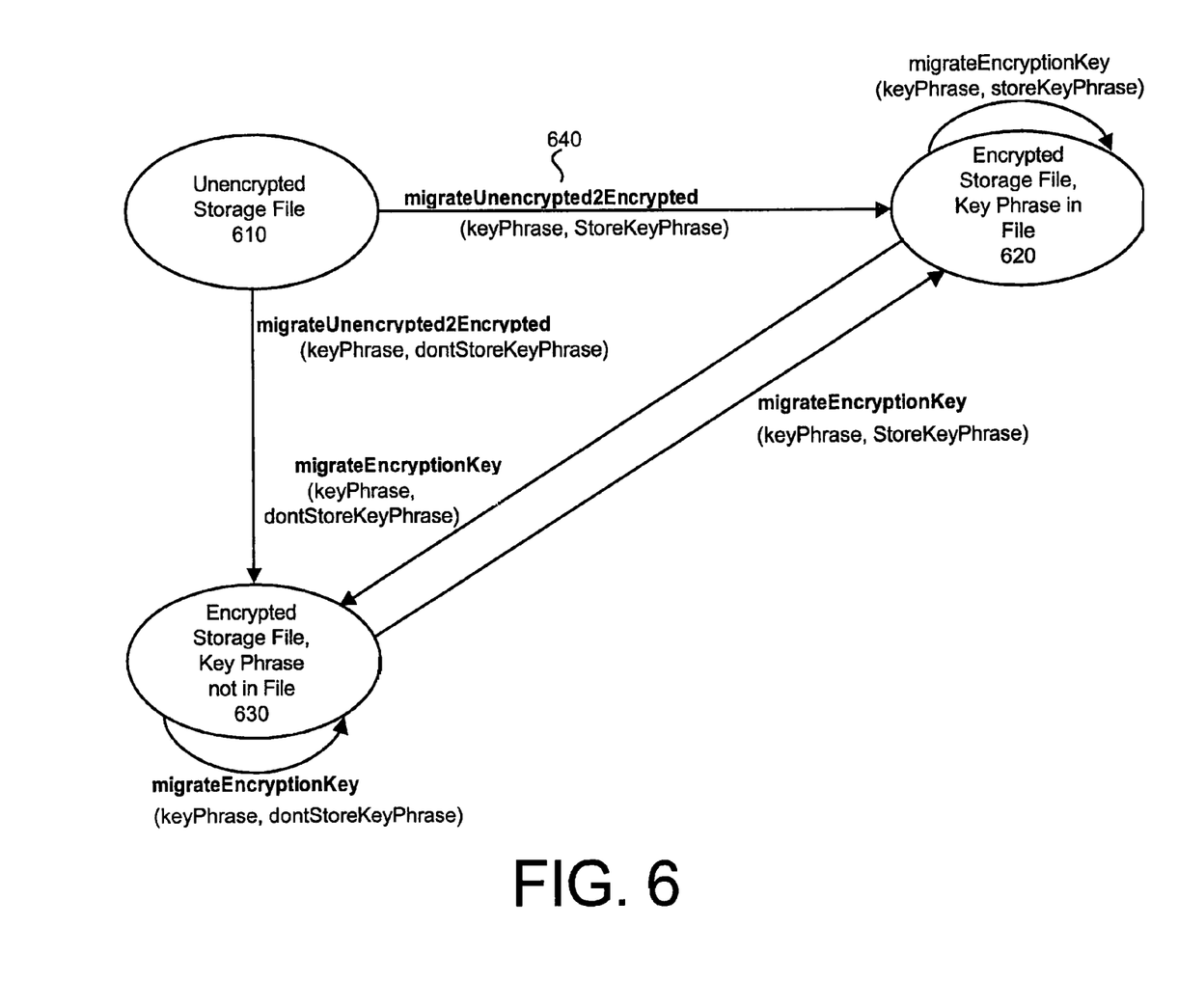
FIG. 6 illustrates migrating a secure storage file from an unencrypted storage file to an encrypted storage file.

As discussed above with reference to FIG. 4, an instance of a secure store agent may be obtained that does not include an optional cryptographic toolkit. A secure store agent without the cryptographic toolkit may create an unencrypted secure store. If a cryptographic toolkit is added to the secure store agent after creating the unencrypted secure store, it may be desirable to migrate the unencrypted secure store to an encrypted secure store. FIG. 6 illustrates migrating a secure storage file from an unencrypted store to an encrypted store.

In an embodiment, unencrypted secure storage file 610 may be migrated to either encrypted secure storage file 620 in which key phrases are stored in a file system or encrypted secure storage file 630 in which key phrases are requested and provided through a dialog box. Reference numeral 640 illustrates that the method "migrateUnencrypted2Encrypted (keyPhrase, true)" may be called to migrate unencrypted secure storage file 610 to encrypted secure storage file 620. Similarly, the method "migrateUnencrypted2Encrypted (keyPhrase, false)" may be called to migrate unencrypted secure storage file 610 to encrypted secure storage file 630.

In an embodiment, it is also possible to migrate between encrypted secure storage file 620 and encrypted secure storage file 630 and vice versa. For example, the method "migrateEncryptionKey (keyPhrase, false)" may be called to migrate from secure storage file 620 to secure storage file 630. Similarly, the method "migrateEncryptionKey (keyPhrase, true)" may be called to migrate from secure storage file 630 to secure storage file 620.

Figure 7:
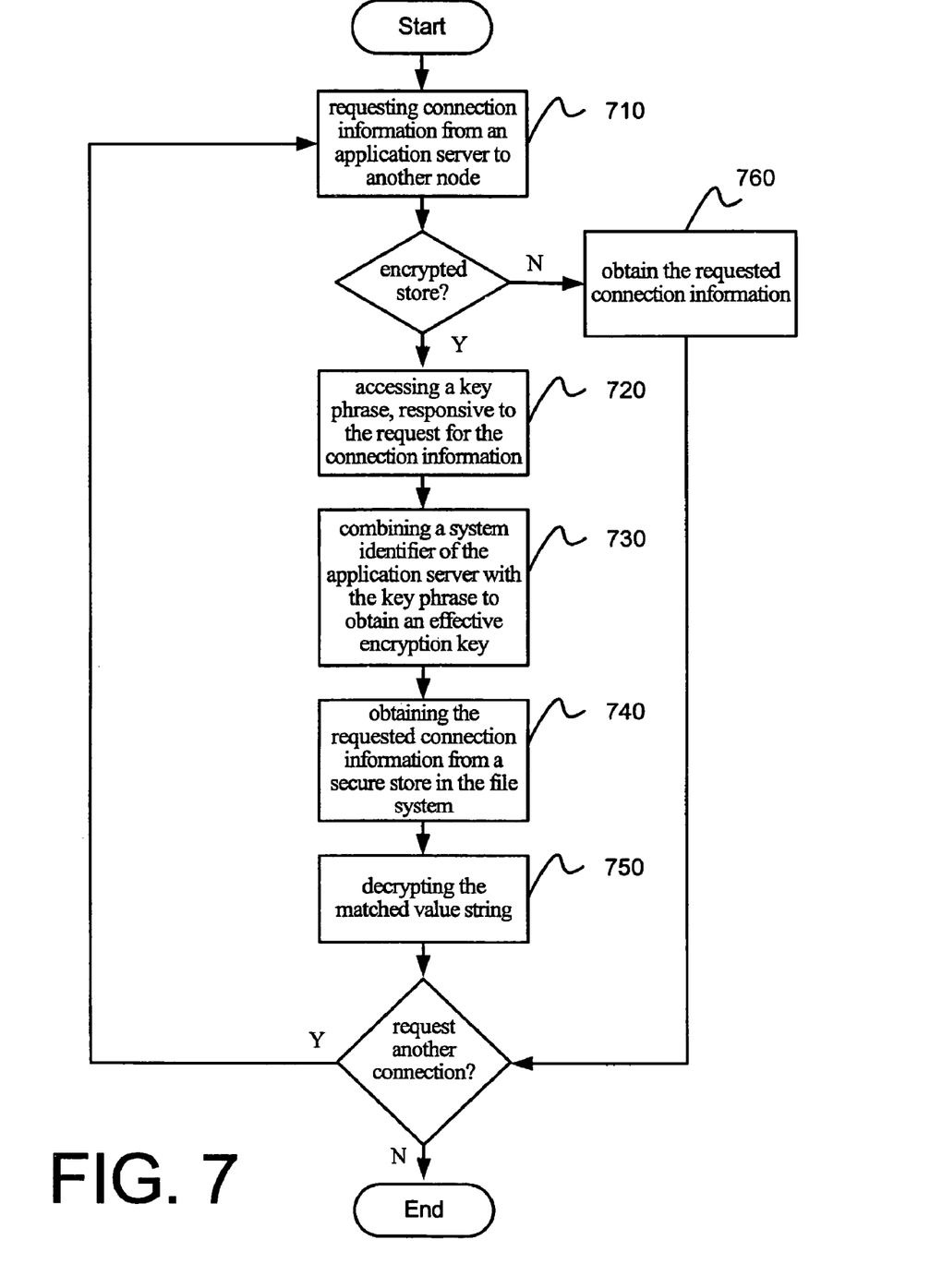
FIG. 7 is a flow diagram illustrating certain aspects of a method for obtaining connection information from a secure storage file, according to an embodiment of the invention.

Turning now to FIG. 7, the particular methods associated with embodiments of the invention are described in terms of computer software and hardware with reference to a flowchart. The methods to be performed by a system for secure access may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating certain aspects of a method for obtaining connection information from a secure storage file, according to an embodiment of the invention. In an embodiment, a process executing on an application server requests connection information at reference numeral 710. For example, an application server may access a configuration file during a power-on or initialization process. The configuration file may direct the application server to connect to a database. Alternatively, an application executing on a user terminal in the user layer may send a database access statement to the application server. In response to the database access statement, a process executing on the application server may request connection information to a database.

In an embodiment, the requested connection information is connection information for a database connection. For example, the database connection information may include a password for the database and an address for the database. In an embodiment, the address of the database may be a Java Database Connectivity (JDBC) Uniform Resource Locator (URL) as described in, for example, the JDBC Application Program Interface (API) Specification 3.0 (13 Feb. 2002). The database connection information may be automatically requested during, for example, initialization of an application server. The application server may be a Web application server. In such an embodiment, the Web application server may comply with the J2EE Standard.

Referring to process block 720, a key phrase is accessed responsive to the request for connection information. In an embodiment, the key phrase is accessed from a file system of the application server (e.g., key phrase file 326 shown in FIG. 3). In an alternative embodiment, the key phrase is accessed from a central directory of a distributed system (e.g., central directory 218 shown in FIG. 2). In such an embodiment, the central directory may be the profile directory of the distributed system. In yet another alternative embodiment, the key phrase is accessed by prompting a user of the application server to provide the key phrase. For example, the user may be prompted to provide the key phrase through either a dialog box or a command line interface.

Referring to process block 730, the accessed key phrase may be combined with a system identifier of the application server to create an effective encryption key. In an alternative embodiment of the invention, the accessed key phrase has already been combined with, for example, the system identifier to create the effective encryption key. The effective encryption key may be used to decrypt the requested connection information that is obtained from a secure storage file at reference numeral 740. In an embodiment, the secure storage file is located in a central directory (e.g., central directory 218, shown in FIG. 2). In an alternative embodiment, the secure storage file is located in a file system of an application server (e.g., secure storage 324, shown in FIG. 3). In an embodiment, a secure store agent obtains the connection information from the secure storage file with a find operation.

In an embodiment, the connection information is not encrypted. In such an embodiment, it may not be necessary to access a key phrase. Instead, the secure store agent may obtain the requested connection information with, for example, a find operation as shown at reference numeral 760.

In an embodiment, the matching value string is decrypted at reference numeral 750. For example, the matching value string may be decrypted according to a Triple DES algorithm as disclosed in the Triple DES Standard. In an embodiment, the key phrase and the value strings are Java strings.

Figure 8:
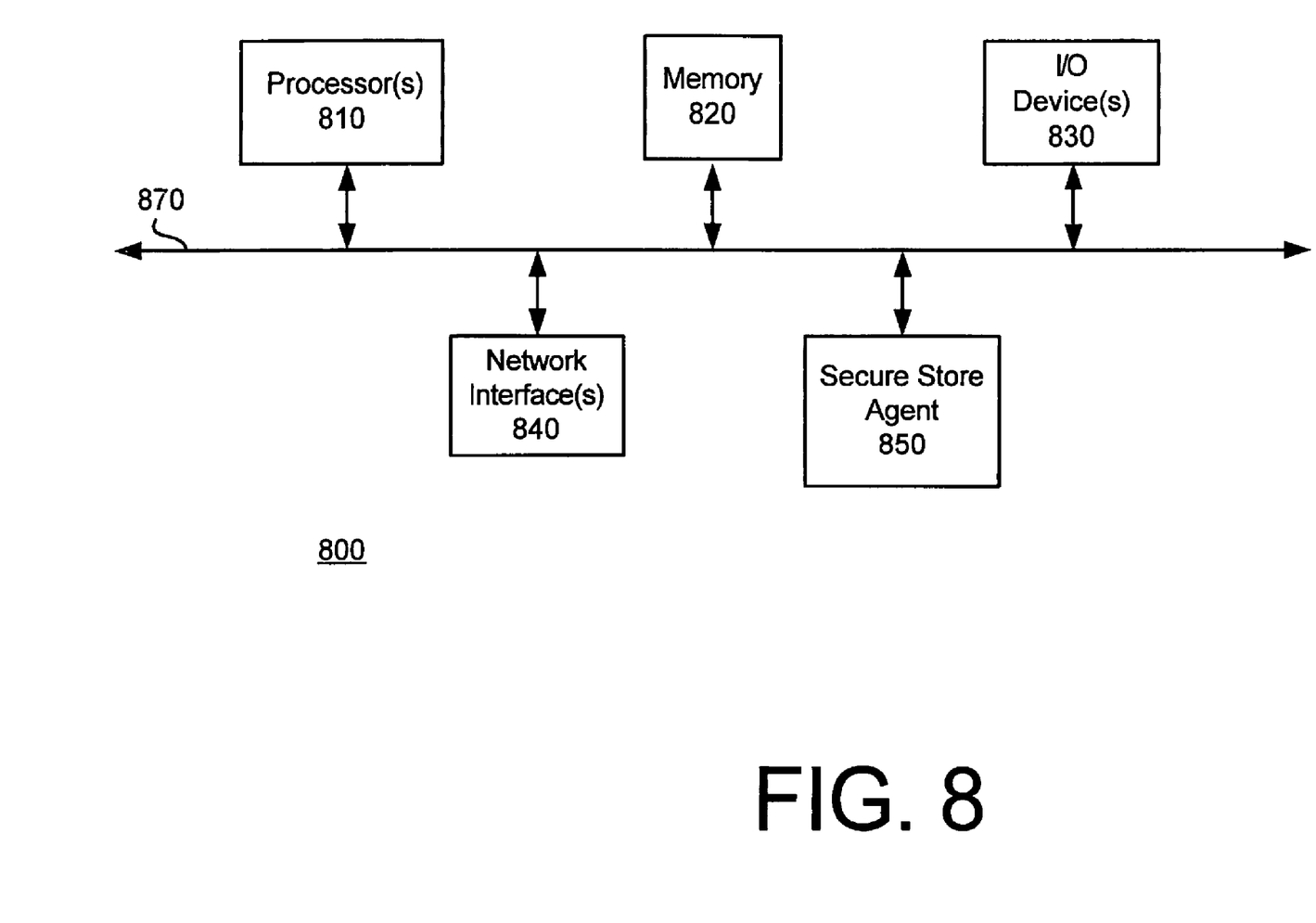
FIG. 8 is a block diagram of node 800 implemented according to an embodiment of the invention.

FIG. 8 is a block diagram of node 800 implemented according to an embodiment of the invention. Node 800 may include: one or more processors 810, memory 820, one or more Input/Output devices 830, network interface(s) 840, and secure store agent 850. The illustrated elements may be connected together through system interconnect 870. One or more processors 810 may include a microprocessor, microcontroller, field programmable gate array (FPGA), application specific integrated circuit (ASIC), central processing unit (CPU), programmable logic device (PLD), and similar devices that access instructions from system storage (e.g., memory 820), decode them, and execute those instructions by performing arithmetic and logical operations.

Secure store agent 850 enables node 800 to provide secure store in a file system. In an embodiment, the secure store is in a file system that is accessible by two or more nodes of a distributed system. Secure store agent 850 may access an encryption key phrase responsive to a request for connection information. The accessed key phrase may be matched to a value string to obtain the requested connection information. Secure store agent 850 may be executable content, control logic (e.g., ASIC, PLD, FPGA, etc.), firmware, or some combination thereof, in an embodiment of the invention. In embodiments of the invention in which secure store agent 850 is executable content, it may be stored in memory 820 and executed by processor(s) 810.

Memory 820 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 820 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 820 may store program modules such as routines, programs, objects, images, data structures, program data, and other program modules that perform particular tasks or implement particular abstract data types that facilitate system use.

One or more I/O devices 830 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 870 permits communication between the various elements of node 800. System interconnect 870 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
   receiving, from an application executing on a user terminal, a database access statement at a web application server;
   accessing a user-configurable key phrase from a key phrase file located in a shared directory accessible by a plurality of web application servers in response to receiving the database access statement of a distributed system responsive to the request for the connection information;
   at the application server, combining a system identifier of the web application server with the user-configurable encryption key phrase to create an encryption key;
   at the application server, obtaining an encrypted string from a secure storage file in the shared directory via a find operation;
   at the application server, parsing the encrypted string into substrings; and
   at the application server, decrypting one of the substrings with the encryption key to obtain connection information to a database including a password and an address for the database.

2. The method of claim 1, wherein the address for the database is a Uniform Resource Locator (URL).

3. The method of claim 1, wherein decrypting the value string comprises:
   decrypting the value string with a triple Data Encryption Standard (DES) algorithm.

4. The method of claim 1, wherein the obtained connection information includes a Java string.

5. The method of claim 1, wherein the Web application server is compatible with the J2EE standard.

6. A system comprising:
   a web application server to access a user-configurable encryption key phrase from a filesystem of the web application server responsive to an automatic request to connect with a database during initialization of the web application server, wherein the web application server includes a system identifier to identify the application server and the key phrase is to be combined with the system identifier;
   a central directory to store a string and to provide the string to the web application server responsive to receiving the combination of the system identifier and the key phrase from the web application server;
   a parser to parse the string into substrings; and
   the database to provide requested data to the web application server.

7. The system of claim 6, wherein the database is a relational database system.

8. The system of claim 6, wherein the Web application server is implemented according to the Java 2 Enterprise Edition Standard.

9. The system of claim 6, wherein the stored string includes at least one of:
   a password to connect with the remote node; and
   an address of the remote node.

10. The system of claim 6, wherein the string is to be stored in a data store of the central directory.

11. The system of claim 10, wherein the data store of the central directory is encrypted.

12. The system of claim 11 wherein the data store is encrypted with a triple DES algorithm.

13. The system of claim 11, wherein the data store of the central directory may be transitioned from storing unencrypted data to storing encrypted data.

14. A system comprising:
   means for receiving, from an application executing on a user terminal, a database access statement at a web application server;
   means for accessing a user-configurable key phrase from a key phrase file located in a shared directory accessible by a plurality of web application servers in response to receiving the database access statement;
   means for combining a system identifier of the web application server with the user-configurable encryption key phrase to create an encryption key;
   means for obtaining an encrypted string from a secure storage file in the shared directory via a find operation;
   means for parsing the encrypted string into substrings; and
   means for decrypting one of the substrings with the encryption key to obtain connection information to a database including a password and an address for the database.

15. An article of manufacture comprising:
   an electronically accessible medium providing instructions that, when executed by an apparatus, cause the apparatus to
   receive, from an application executing on a user terminal, a database access statement at a web application server;
   access a user-configurable key phrase from a key phrase file located in a shared directory accessible by a plurality of web application servers in response to receiving the database access statement;
   combine a system identifier of the web application server with the user-configurable encryption key phrase to create an encryption key;
   obtain an encrypted string from a secure storage file in the shared directory via a find operation;
   parse the encrypted string into substrings; and
   decrypt one of the substrings with the encryption key to obtain connection information to a database including a password and an address for the database.

* * * * *

UNITED STATES PATENT AND TRADEMARK OFFICE
CERTIFICATE OF CORRECTION

PATENT NO. : 7,640,594 B2  Page 1 of 1
APPLICATION NO. : 10/762834
DATED : December 29, 2009
INVENTOR(S) : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Twenty-first Day of December, 2010

David J. Kappos
*Director of the United States Patent and Trademark Office*